Dec. 13, 1949     R. M. NELSON     2,491,128
BUFFER
Filed July 18, 1946
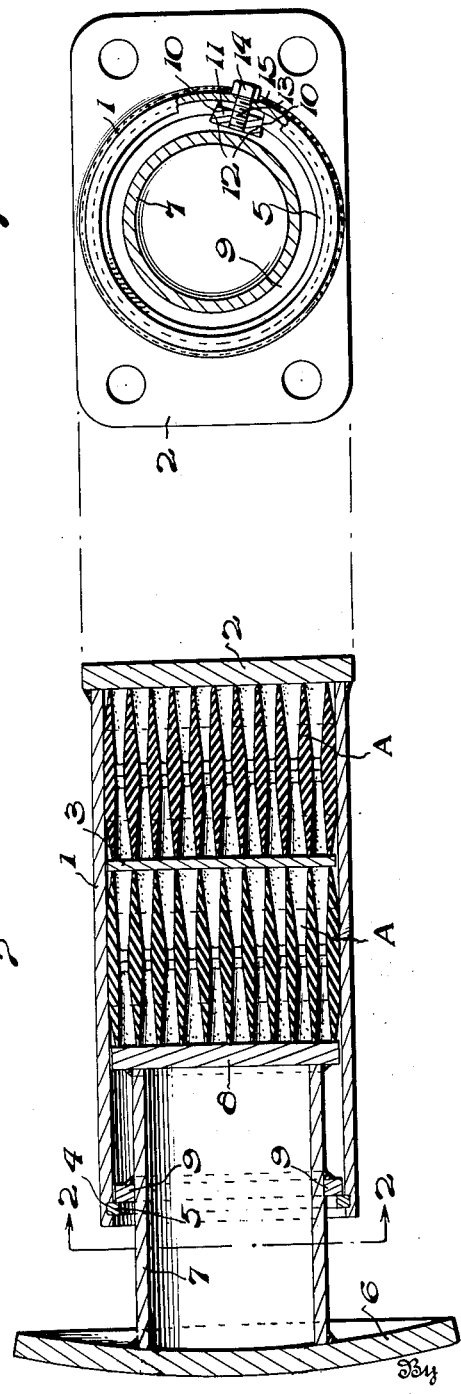
Inventor
Robert M. Nelson.
By
Attorney Patented Dec. 13, 1949

2,491,128

UNITED STATES PATENT OFFICE 2,491,128

BUFFER

Robert M. Nelson, Wilmette, Ill., assignor to Peerless Equipment Company, Chicago, Ill., a corporation of Delaware Application July 18, 1946, Serial No. 684,402

2 Claims. (Cl. 213—221)

This invention relates to buffers for railway cars and more particularly to a construction utilizing rubber cushioning units.

A primary object of the invention is to provide a construction which lends itself to standard manufacturing practices and provides adequate and substantial means for receiving the rubber cushion units while at the same time interconnecting the housing and the plunger in such a way that they may be readily assembled or taken apart.

Another object of the invention is to provide a construction having relatively few and substantial parts thus not only simplifying manufacture, but at the same time providing a construction which is rugged and substantial in use.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:

Fig. 1 is a longitudinal cross sectional view of the improved buffer construction.

Fig. 2 is a vertical cross section taken on the line 2—2 of Fig. 1.

Similar reference characters designate corresponding parts throughout the several figures of the drawings.

Referring to Fig. 1 it will be observed that the invention includes in its organization, a cylindrical housing 1 provided at one end with a rear wall 2, said housing and wall constituting a pocket for receiving a plurality of rubber spring cushioning units A—A, preferably of the type shown in U. S. Patent No. 2,328,878 issued September 7, 1943. These units are preferably separated by the partitions 3 and are intended to be compressed against the inner face of the rear wall 2.

The end of the housing opposite the wall 2 is provided with a recess 4 for receiving a locking split ring 5 which will be referred to more in detail hereafter. The open end of the housing is intended to receive a plunger including an external buffer head 6 and a hollow shank portion 7 of less diameter than the internal diameter of the housing 1. The inner end of the shank 7 is provided with a head 8 for engaging and compressing the rubber cushion units A. This shank 7 of the plunger is provided externally with a rigid annular abutment 9 located substantially midway of the opposite ends of the shank. As shown, this abutment 9 is preferably welded to the shank and is engaged by the locking ring 5 when the latter is positioned in the recess 4 to interlock the plunger and housing.

Referring further to the locking ring 5, it will be observed from Fig. 2 that the said ring, made of spring steel, is divided and the end faces thereof are angularly inclined or beveled as indicated at 10. The purpose of the angular faces 10 is to cooperate with complemental wedge faces 12 on a wedge block 11. This block is provided with a threaded opening to receive the threaded shank portion 13 of a bolt 14 which is loosely fitted in an opening 15 in the housing. The bolt 14 is free to turn or rotate relative to the opening 15 in the housing but the threaded shank 13 thereof operatively engages the threaded opening of the wedge block 11 so that when the head of the bolt 14 is rotated, the inclined end portions of the wedge block will engage the angular ends of the split ring. The bolt 14 is then inserted in the opening 15 until the shank portion 13 engages the wedge block. Rotation of the bolt 14 in the appropriate direction will force the wedge into engagement with the ring and thus complete the assembly.

From the foregoing it will be apparent that the invention provides a plunger having a rigid annular abutment which is intended to be engaged by a removable locking ring. This arrangement enables proper initial assembly or subsequent disassembly, if and when required, to effect renewals of the rubber spring units.

I claim:

1. A buffer comprising a tubular housing open at its front end and closed at its rear end, a plunger slidable in the front end portion of said housing, resilient means interposed between the inner end of said plunger and the rear end of said housing to resist inward movement of said plunger relative to said housing, said plunger including a shank of less diameter than the internal diameter of said housing, an abutment on said shank, said housing having therein, adjacent to its front end, an inwardly opening annular channel, a split ring of a normal diameter to be freely insertable into the front end portion of said housing and to be forcibly expanded into said channel to constitute a stop for engagement by said abutment to limit forward movement of said plunger relative to said housing, a wedge block movable between the ends of said split ring to expand the same into said channel, and screw means cooperating with said housing and said block to move the latter to expand said ring and to hold said block in a position maintaining said ring in said channel.

2. A buffer as set forth in claim 1 in which the wedge block is movable radially relative to the housing to expand the split ring, and in which the screw means for expanding said split ring comprises a bolt extending loosely through an opening in the housing and threaded into said block.

ROBERT M. NELSON.

REFERENCES CITED

The following references are of record in the file of this patent:

UNITED STATES PATENTS

| Number | Name | Date |
|---|---|---|
| 1,902,697 | Ellingsen | Mar. 21, 1933 |
| 2,328,878 | Gallagher | Sept. 7, 1943 |
| 2,338,453 | Nelson | Jan. 4, 1944 |

FOREIGN PATENTS

| Number | Country | Date |
|---|---|---|
| 350,622 | Great Britain | June 18, 1931 |
| 364,441 | Great Britain | Jan. 7, 1932 |